United States Patent [19]

Yamamoto

[11] Patent Number: 5,675,717
[45] Date of Patent: Oct. 7, 1997

[54] IMAGE PROCESSING APPARATUS AND METHOD FOR PREVIEWING A COLOR IMAGE GENERATED BY A COLOR PRINTER AND DISPLAYED AT A HOST COMPUTER

[75] Inventor: Tsuyoshi Yamamoto, Higashikatsushika-gun, Japan

[73] Assignee: Canon Kabushiki Kaisha, Tokyo, Japan

[21] Appl. No.: 378,371

[22] Filed: Jan. 25, 1995

[30] Foreign Application Priority Data

Jan. 31, 1994 [JP] Japan ..................... 6-009563
Dec. 20, 1994 [JP] Japan ..................... 6-316563

[51] Int. Cl.$^6$ ..................... G06K 15/02; H04N 1/50
[52] U.S. Cl. ..................... 395/109; 358/501; 358/527
[58] Field of Search ..................... 358/527, 501, 358/462, 518, 519, 520, 521, 523, 447; 382/167, 176, 299; 395/109, 128

[56] References Cited

U.S. PATENT DOCUMENTS

| | | | |
|---|---|---|---|
| 5,081,529 | 1/1992 | Collette | 358/527 |
| 5,146,323 | 9/1992 | Kobori et al. | 358/527 |
| 5,210,600 | 5/1993 | Hirata | 358/527 |
| 5,276,511 | 1/1994 | Takemoto | 358/527 |

*Primary Examiner*—Scott A. Rogers
*Attorney, Agent, or Firm*—Fitzpatrick, Cella, Harper & Scinto

[57] ABSTRACT

In an image processing apparatus for previewing a color image, by using a color output device for forming a preview image, processing is decentralized, the load on a host computer is reduced, and a preview-processing program can be easily formed. The apparatus includes a communication device, e.g., a bidirectional interface, for communicating with a host computer, an output device for outputting image information for image formation to an image forming device for forming an image on a recording material based on input color-image information from the host computer, and a color conversion device for previewing an image which generates color-preview-image information for correcting the image formed by the image forming device on a color monitor. The color-preview-image information is transmitted to the host computer by the communication device.

16 Claims, 14 Drawing Sheets

FIG.3

PREVIEW-INSTRUCTING
COMMAND

| COMMAND NUMBER ||||||
|---|---|---|---|---|---|
| PREVIEW FLAG ||||||
| R VALUE | G VALUE | B VALUE | Y VALUE | M VALUE | C VALUE |
| R VALUE | G VALUE | B VALUE | Y VALUE | M VALUE | C VALUE |
| R VALUE | G VALUE | B VALUE | Y VALUE | M VALUE | C VALUE |
| | | | | | |
| R VALUE | G VALUE | B VALUE | Y VALUE | M VALUE | C VALUE |
| END SYMBOL ||||||

ON : DATA FOR PREVIEW

OFF : PRINTING DATA

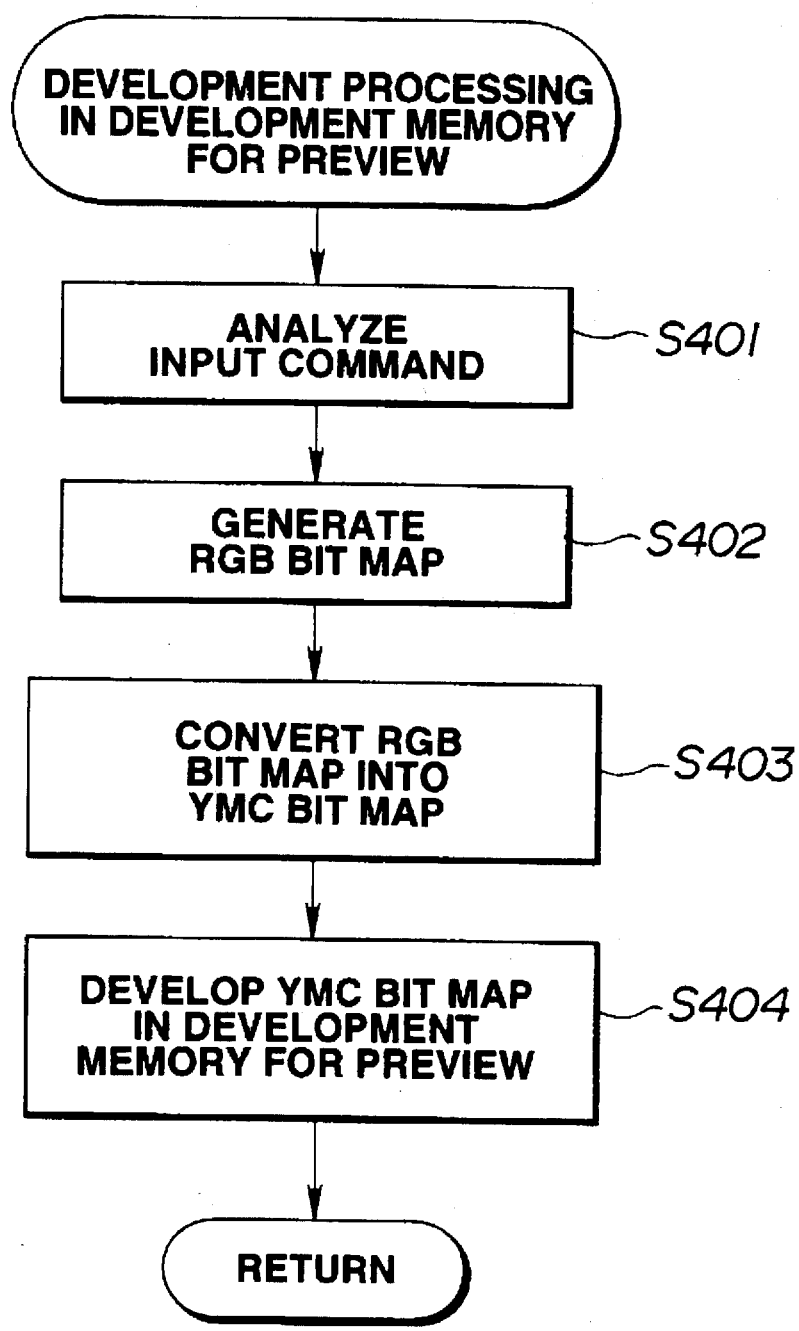

IMAGE PROCESSING APPARATUS AND METHOD FOR PREVIEWING A COLOR IMAGE GENERATED BY A COLOR PRINTER AND DISPLAYED AT A HOST COMPUTER

BACKGROUND OF THE INVENTION

1. Field of the Invention

The present invention relates to an image processing apparatus and method for previewing a color image on a monitor prior to printing the color image.

2. Description of the Related Art

When outputting a color image to a color monitor and a color printer, if image data for the color image is supplied to both the color monitor and the color printer, an output image on the color monitor is formed which has a different color tone than a printed image formed by the color printer. This is due to the different characteristics of the two devices. Accordingly, the color printer performs color correction on the image data in order to adjust the color tone of the printed image.

In general, in the color printer, correction parameters for color correction of the input color image are determined in advance by a printer driver or an application program, and color correction is performed by providing the color printer with these parameters as a command. The color printer, in some cases, generates the color correction parameters.

The image printed by the color printer is different from the image observed on the color monitor. Accordingly, before printing the image, a host computer forms an image to be printed by the color printer, and displays the image on the picture surface, i.e., the screen, of the color monitor in order to confirm an output image to be printed. Such confirmation processing is called "preview".

Conventionally, the host computer forms an image for preview by estimating color processing performed by the color printer. In this approach, the operation of the color printer must be simulated. Accordingly, it is difficult for the host computer to perform completely the same processing as that of the color printer. The host computer must also form an analysis program provided in the color printer in order to preview image data described by a page description language. In addition, the host computer consumes a great deal of calculation time, thereby causing a load on the host computer.

SUMMARY OF THE INVENTION

It is an object of the present invention to provide an image processing apparatus and method for previewing a color image in which the above-described problems are solved.

It is another object of the present invention to generate preview-image information without requiring excessive CPU time from the host computer.

It is a still another object of the present invention to obtain preview-image information having high picture quality by performing color processing corresponding to an image type.

It is still another object of the present invention to create a preview image which takes into account changes in characteristics of a monitor.

It is still another object of the present invention to obtain preview-image information corresponding to the number of gradation steps of an image forming means.

According to one aspect, the present invention which achieves these objectives relates to an image processing apparatus which includes communication means for communicating with a host computer, output means for outputting image information for image formation to image forming means for forming an image on a recording material based on input color-image information from the host computer, and generation means for generating color-preview-image information for reproducing the image formed by the image forming means on a color monitor. The communication means transmits the color-preview-image information to the host computer.

According to another aspect, the present invention relates to an image processing method which includes the steps of communicating with a host computer, outputting image information for image formation to image forming means for forming an image on a recording material based on input color-image information from the host computer, and generating color-preview-image information for reproducing the image formed by the image forming means on a color monitor, and transmitting the color-preview-image information.

According to one aspect, the present invention is an image processing apparatus which includes output means for outputting image information to image forming means for forming an image onto a recording material based on color-image information input from a host computer and generation means for generating color-preview-image information for reproducing the image formed by the image forming means on a color printer. Communication means transmites the color-preview-image information to the host computer.

According to another aspect, the present invention is an image processing method which includes outputting image information to image forming means for forming an image onto a recording material based on color-image information input from a host computer and generating color-preview-image information for reproducing the image formed by the image forming means on a color monitor. The color-preview-image information is then transmitted to the host computer.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 3 is a table illustrating a format of a preview-instructing command;

FIG. 9 is a flowchart of bit-map development in the second embodiment of the present invention;

DETAILED DESCRIPTION OF THE PREFERRED EMBODIMENTS

First Embodiment

Figure 1:
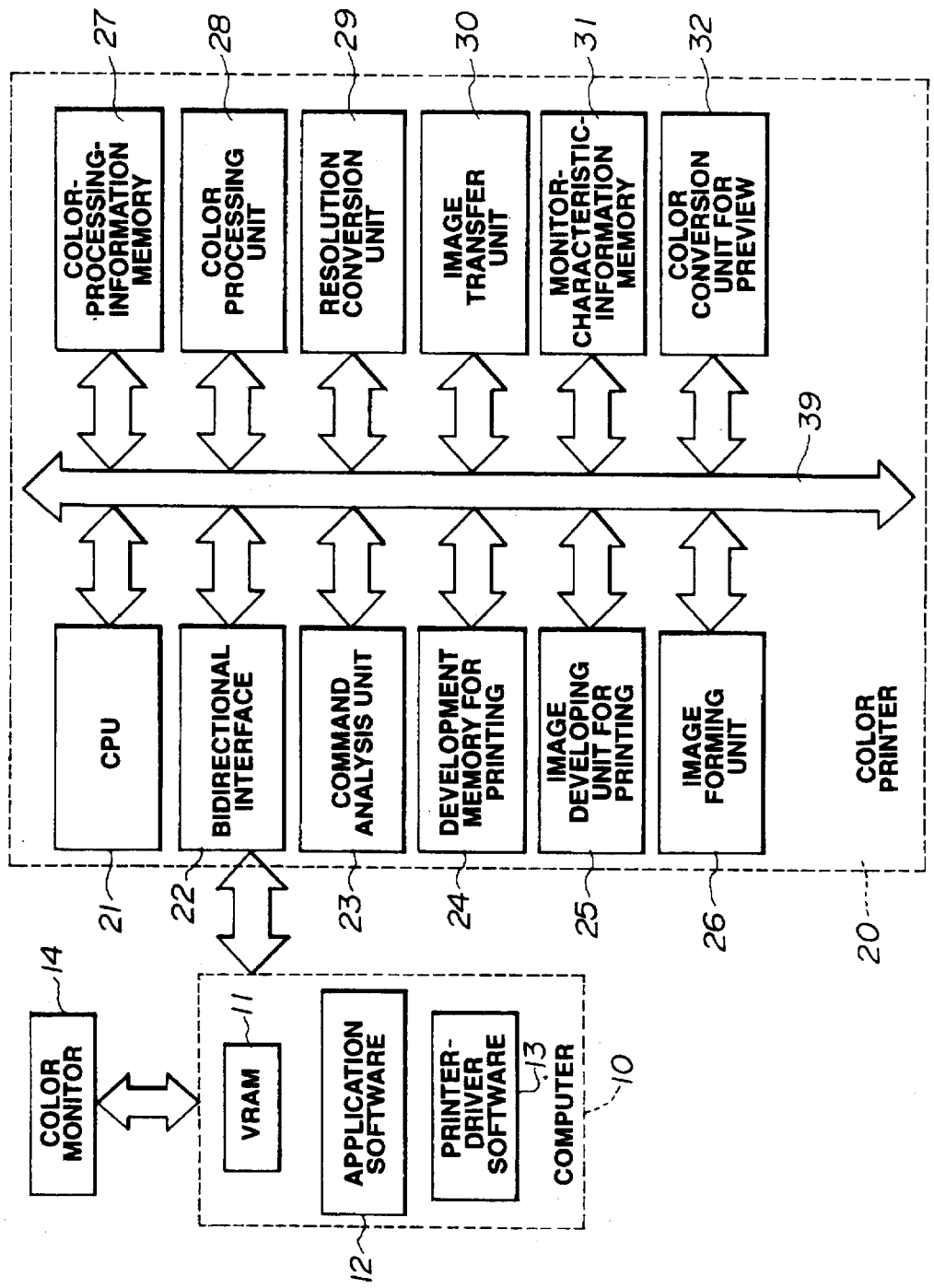
FIG. 1 is a block diagram illustrating the configuration of a first embodiment of the present invention.

FIG. 1 illustrates the configuration of a first embodiment of the present invention, in which color printer 20 is electrically connected to host computer (hereinafter abbreviated as a "computer") 10. Application software 12 and printer-driver software 13 are stored in a main storage device or an auxiliary storage device in computer 10. Color monitor (hereinafter abbreviated as a "monitor") 14 is also electrically connected to computer 10. An image to be output to monitor 14 or printed by color printer 20 is supplied from video memory (VRAM) 11 (or a storage device) in computer 10 to monitor 14 or to color printer 20, respectively.

Color printer 20 includes a CPU (central processing unit) 21, which includes a ROM (read-only memory) and a RAM (random access memory), for controlling the entire apparatus, bidirectional Centronix interface 22 for receiving image data and commands from computer 10 and for transmitting image data to computer 10, and command analysis unit 23 for analyzing input commands. Development memory for printing 24 develops three-color components of an image, i.e., cyan, magenta and yellow components; image developing unit for printing 28 develops the analysis result from command analysis unit 23 in development memory for printing 24; and image forming unit 26 forms a permanent visual image on a recording medium such as paper, based on binary data. Color-processing-information memory 27 stores color-processing information indicating the relationship between a standard RGB color system and a CMY color system which depends on a printer; color processing unit 28 performs color processing on an input image based on color-processing information stored in color-processing-information memory 27; and resolution conversion unit 29 converts a resolution of image data stored in development memory for printing 24. Image transfer unit 30 transfers generated image data to computer 10 via bidirectional interface 22. Monitor-characteristic-information memory 31 stores color characteristics of monitor 14, i.e., combinations of RGB data which depend on the monitor 14 and YMC data which depend on color printer 20, which serves as monitor-characteristic information for a preview-instructing command. Color conversion unit for preview 32 forms data for preview by performing color conversion of data stored in development memory for printing 24 based on the monitor-characteristic information stored in monitor-characteristic-information memory 31. Data bus 39 electrically connects the above-described units to each other.

In the present embodiment, image data supplied from computer 10 to monitor 14 and to color printer 20 is 8-bit, 90-dpi (dots per inch) RGB data and image data supplied from image forming unit 26 and from color printer 20 to computer 10 is 360-dpi data.

Figure 2:
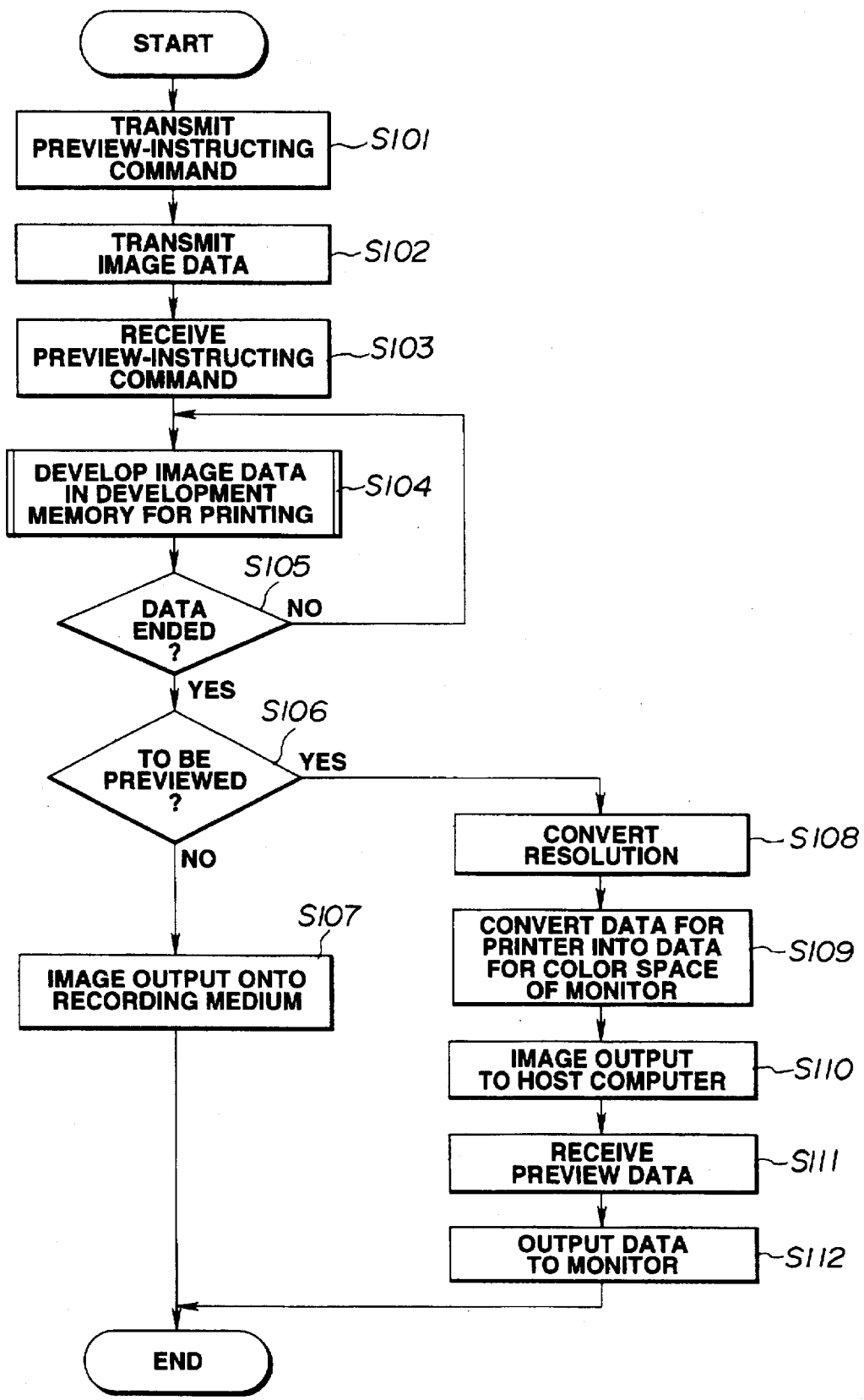
FIG. 2 is a flowchart showing an example of the printing-information processing procedures performed by the color printer and the computer, both shown in FIG. 1.

FIG. 2 is a flow diagram illustrating an example of printing-information processing procedures peformed by color printer 20 and by computer 10 in the first embodiment.

In FIG. 2, steps S101, S102, S111 and S112 correspond to processing performed by computer 10, and steps S103–S110 correspond to processing performed by color printer 20.

In order to obtain a printed image corresponding to an image generated on a monitor, computer 10 transmits a preview-instructing command to color printer 20 via application software 12 and printer-driver software 13 in response to an instruction from a user (step S101). Image data is then transmitted to color printer 20 (step S102).

FIG. 3 illustrates the format of a preview-instructing command transferred from computer 10 to color printer 20. The preview-instructing command includes a command number which indicates that a command transmitted from computer 10 to color printer 20 is a preview-instructing command and a flag which indicates whether a preview is to be performed.

The preview-instructing command also includes data which indicates a plurality of combinations of RGB multi-value data based on display characteristics of monitor 14 and corresponding YMC binary data based on output characteristics of image forming unit 26. That is, combinations of RGB values and YMC values are transferred which have been previously obtained by calculating YMC values of color printer 20 which has Lab values that are closely related to Lab values corresponding to respective RGB values of monitor 14. The relationship between the YMC values and the RGB values is determined from a table of Lab values corresponding to respective YMC values of color printer 20 obtained from colorimetric data and from a table of Lab values corresponding to respective RGB values of monitor 14 obtained from colorimetric data.

Color printer 20 reads the preview-instructing command from bidirectional interface 22 and command analysis unit 23 analyzes the preview-instructing command. Color printer 20 determines whether image data is to be previewed and stores the combinations of RGB values and YMC values included in the preview-instructing command as a look-up table (step S103) in monitor-characteristic-information memory 31. Thereafter, image data received from computer 10 via bidirectional interface 22 is subjected to bit-map development in development memory for printing 24 as described below (step S104). The bit-map development is performed until all image data has been developed (step S105).

Figure 6:
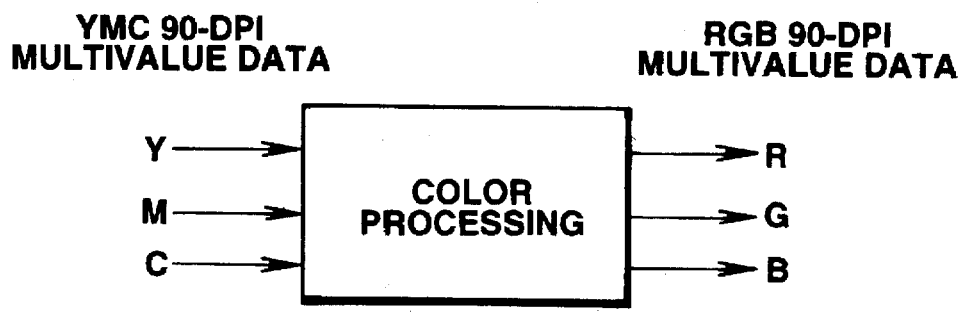
FIG. 6 is a diagram illustrating an equivalent circuit for converting a YMC system into an RGB system in the first embodiment of the present invention.

After all image data has been developed, it is determined whether to perform a preview based on the result of the analysis of command analysis unit 23 (step S106). If a preview is not to be performed, data stored in development memory for printing 24 is printed on a recording medium, such as paper, by image forming unit 26 (step S107). If a preview is to be performed, resolution conversion unit 29 converts the 360-dpi YMC image data developed for image formation into 90-dpi YMC image data which can be displayed on monitor 14 (step S108). Thereafter, color conversion unit for preview 32 converts the 90-dpi YMC binary image data into 90-dpi RGB multivalue image data for preview, which depends on monitor 14. The conversion is based on information indicating the combinations of YMC values, which depend on color printer 20, and RGB values, which depend on monitor 14, stored in monitor-characteristic-information memory 31 (step S109). Image transfer unit 30 transfers the image data for preview to computer 10 (step S110). FIG. 6 illustrates an equivalent circuit for performing the conversion processing of step S109.

By converting the image data resolution from 360 dpi into 90 dpi in step S108, it is possible to reduce the amount of preview image data transmitted from color printer 20 to computer 10, and thereby to shorten the transfer time. Since the converted image data can be displayed on monitor 14, the displayed image is not degraded.

Computer 10 receives RGB multivalue image data for preview which is corrected based on the 90-dpi resolution of monitor 14 (step S111) and outputs the received image data to monitor 14 (step S112).

Figure 4:
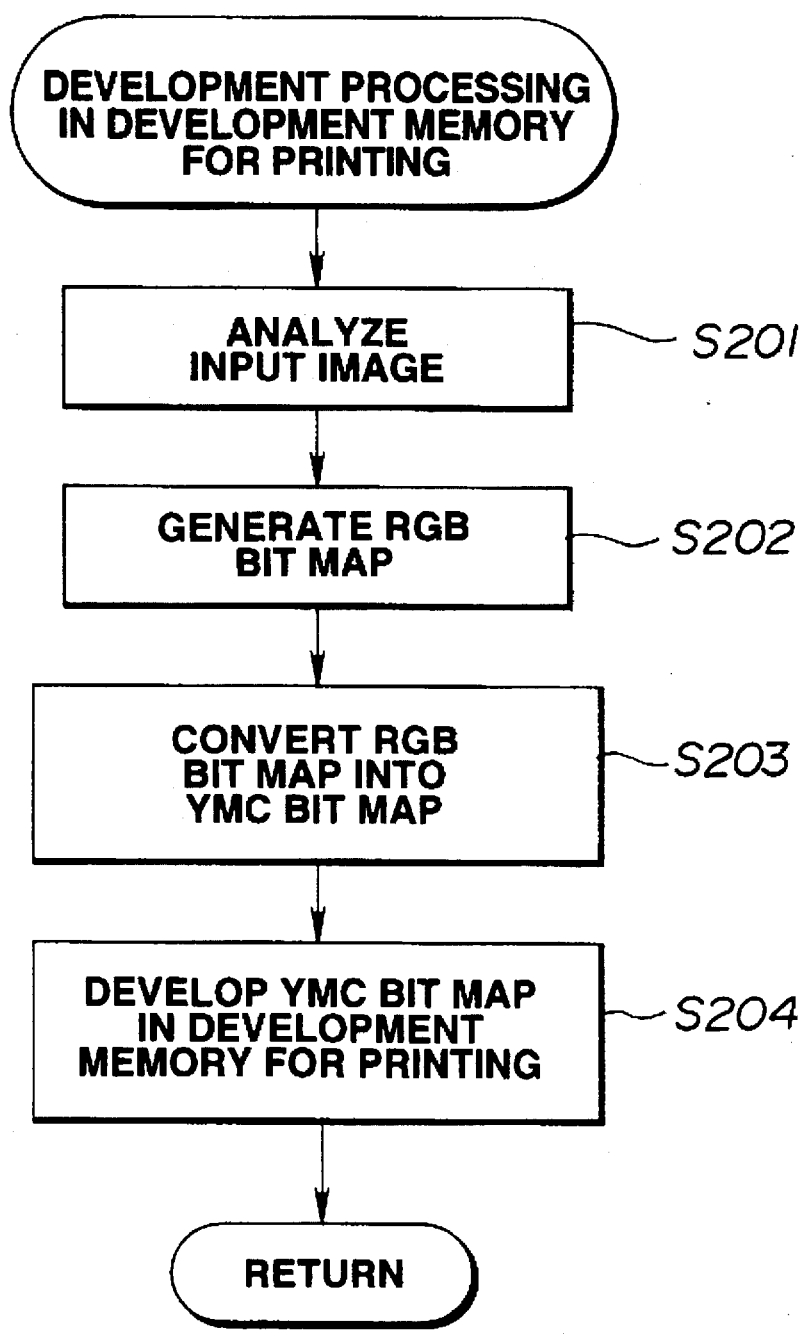
FIG. 4 is a flowchart of bit-map development in the first embodiment of the present invention.

FIG. 4 is a detailed flow diagram of the above-described bit-map development processing in development memory for printing 24. Command analysis unit 23 analyzes the input preview-instructing command (step S201) and image developing unit for printing 25 generates an RGB multivalue bit map based on a standard RGB color space, such as NTSC or the like (step S202). Color processing unit 28 converts the RGB multivalue bit map into a YMC binary bit map, which depends on color printer 20. The conversion is based on color-processing information stored in color-processing-information memory 27 (step S203). The obtained bit map is stored in development memory for printing 24 (step S204).

Figure 5:
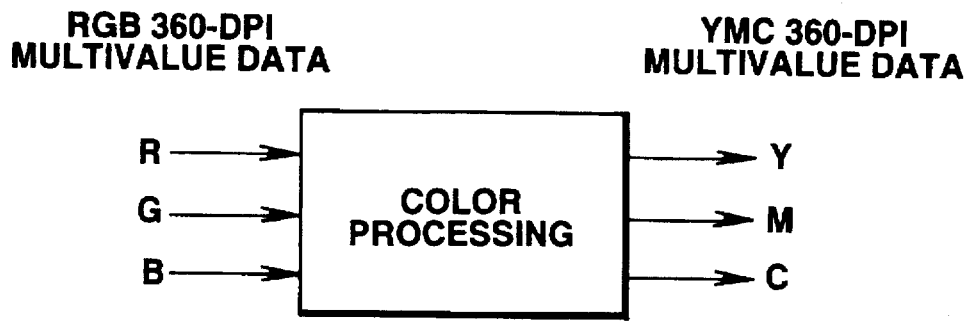
FIG. 5 is a diagram illustrating an equivalent circuit for converting an RGB system into a YMC system in the first embodiment of the present invention.

FIG. 5 illustrates an equivalent circuit for performing the color conversion processing of step S203. In the color conversion processing of step S203, RGB multivalue data, which depends on monitor 14, is first converted into YMC multivalue data, which depends on color printer 20. The obtained YMC multivalue data is then converted into YMC binary data by performing binary-coding processing by either the error diffusion method, the dither method or any equivalent thereof.

In the above-described first embodiment, it is possible to reduce the amount of storage space in computer 10 required for preview and to reduce the processing time required for preview. In addition, since color printer 20 performs color conversion using characteristics of monitor 14, processing by computer 10 can be performed independent of monitor 14 and color printer 20. Furthermore, since the controller of the color printer 20 performs color conversion in accordance with characteristics of monitor 14, computer 10 is only required to output received preview data to monitor 14.

As described above, since a preview image is formed by the controller of the color printer 20, processing is decentralized, thereby reducing the storage space in computer 10 required for preview as well as the amount of CPU time required. As a result, a preview processing program can be easily generated. Since a user can assign either a preview display or a normal display, a preview display is performed only when the user desires it. In addition, all user instructions can be input from computer 10.

Since computer 10 transmits data indicating characteristics of monitor 14, color printer 20 need not have the data and can deal with monitor 14 only by converting the transmitted data.

In addition, since preview image data is formed by performing binary-coding processing of input image data and performing bit-map development of the obtained binary data in development memory for printing 24, the binary-coding processing in step S203 can reflect on the preview image. That is, a preview image based on characteristics of a binary printer can be obtained.

Second Embodiment

Figure 7:
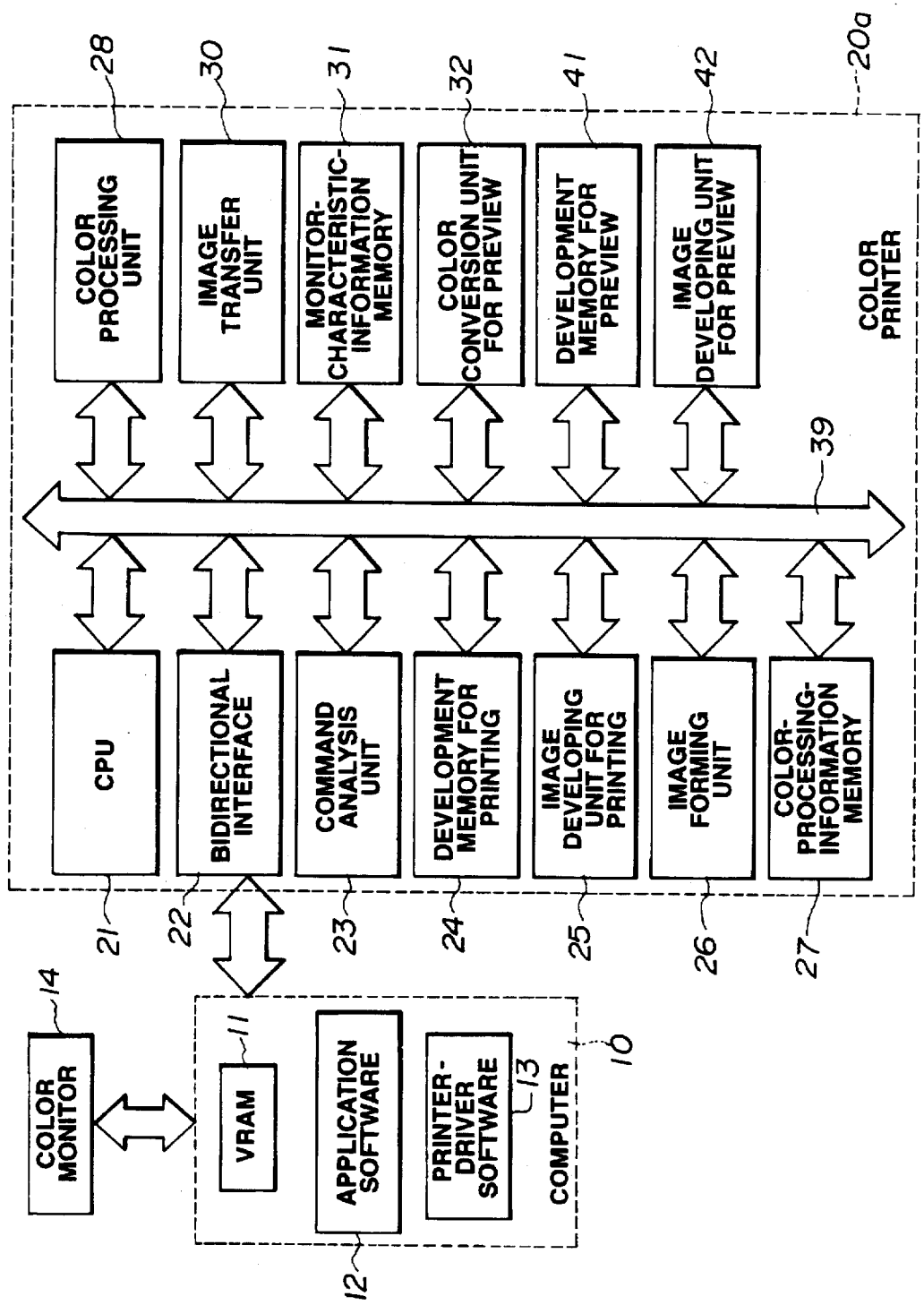
FIG. 7 is a block diagram illustrating the configuration of the second embodiment of the present invention.

FIG. 7 illustrates the configuration of a second embodiment of the present invention in which color printer 20 is electrically connected to computer 10.

Color printer 20a of the second embodiment of the present invention is a modification of color printer 20 of the first embodiment. Color printer 20a includes development memory for preview 41 and image developing unit for preview 42.

The following description of FIG. 7 will address only those components of the present embodiment which differ from the components of the first embodiment shown in FIG. 1.

Color printer 20a includes development memory for preview 41 which develops an image for preview that has three color components, i.e., cyan, magenta and yellow components and image developing unit for preview 42 which develops the result of the analysis of command analysis unit 23 in development memory for preview 41. In the present embodiment, as in the first embodiment, bidirectional interface 22 is a bidirectional Centronix interface.

Image data supplied from computer 10 to monitor 14 and to color printer 20a is 8-bit, 90-dpi RGB data; image data developed in development memory for preview 41 is 1-bit, 90-dpi YMC data; and image data supplied to image forming unit 26 is 1-bit, 360-dpi YMC data.

Figure 8:
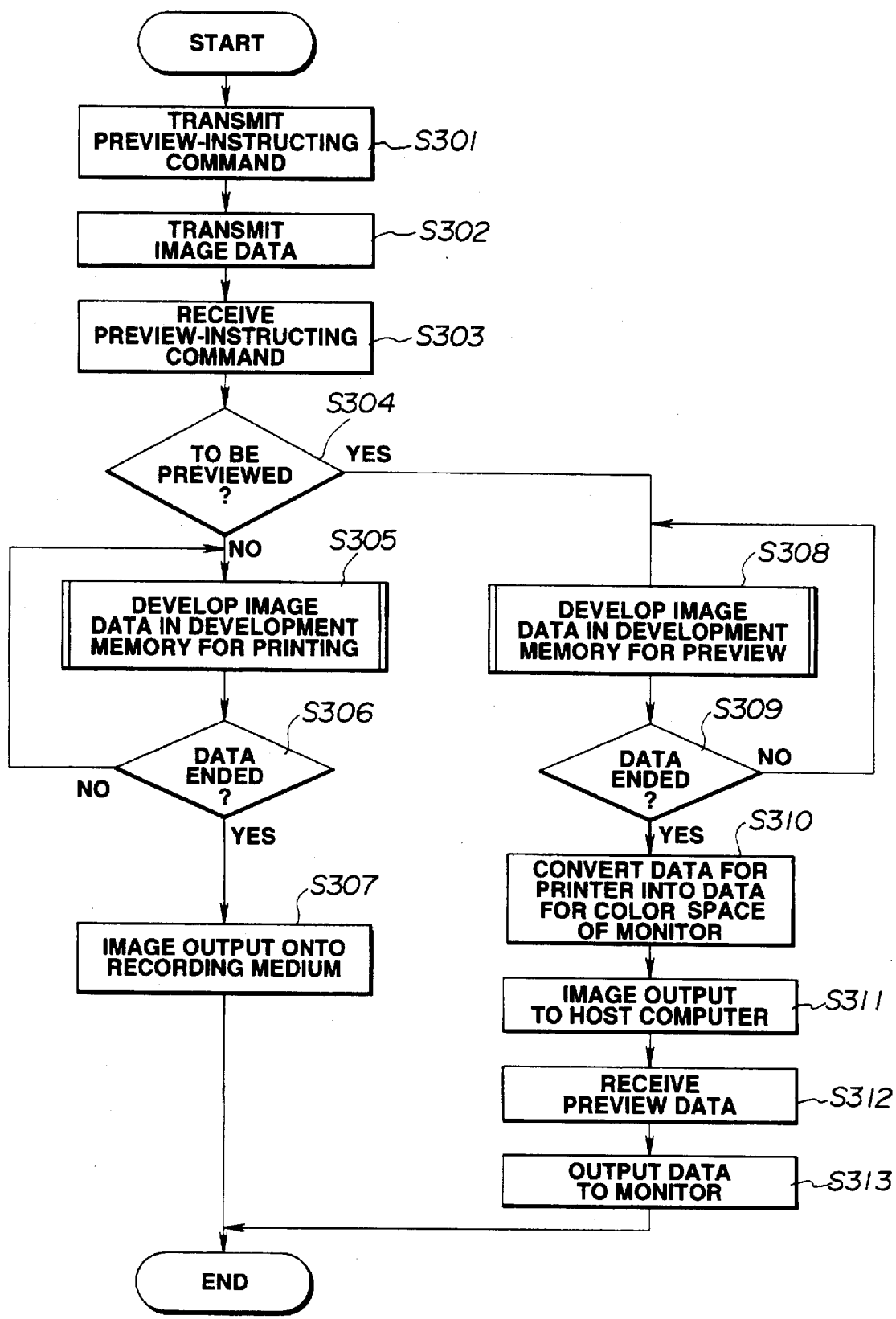
FIG. 8 is a flowchart showing an example of printing-information processing procedures performed by the color printer shown in FIG. 7 and a computer.

FIG. 8 is a flow diagram illustrating an example of printing-information processing procedures peformed by color printer 20a and by computer 10 of the second embodiment of the present invention. In order to obtain a printed image corresponding to an image generated on a monitor, computer 10 transmits a preview-instructing command to color printer 20a via application software 12 and printer-driver software 13 (step S301). Image data is then transmitted to color printer 20a (step S302).

Color printer 20 receives the preview-instructing command from bidirectional interface 22 (step S303), determines whether the image data is to be previewed (step S304), and stores combinations of RGB values which depend on monitor 14, and YMC values which depend on color printer 20a, in monitor-characteristic-information memory 31 as a look-up table. If the image data is not to be previewed, the image data received from computer 10 via bidirectional interface 22 is subjected to bit-map development in development memory for printing 24 (step S305). The bit-map development is repeated until all image data has been developed (step S306). When all image data has been developed, image forming unit 26 prints the image data stored in development memory for printing 24 on a recording medium, such as paper (step S307).

If the image data is to be previewed (as determined in step S304), the image data received from computer 10 via bidirectional interface 22 is subjected to bit-map development in development memory for preview 41, as shown in FIG. 9 (step S308). The bit-map development is performed until all image data has been developed (step S309).

When all image data has been developed, color conversion unit for preview 32 converts YMC binary data, which depends on color printer 20a, into RGB multivalue data, which depends on monitor 14 (step S310). Image transfer unit 30 transfers the obtained RGB data to computer 10 as image data for preview (step S311). Computer 10 receives the 90-dpi RGB multivalue output image data (step S312) and displays the received data on monitor 14 (step S313).

Figure 10:
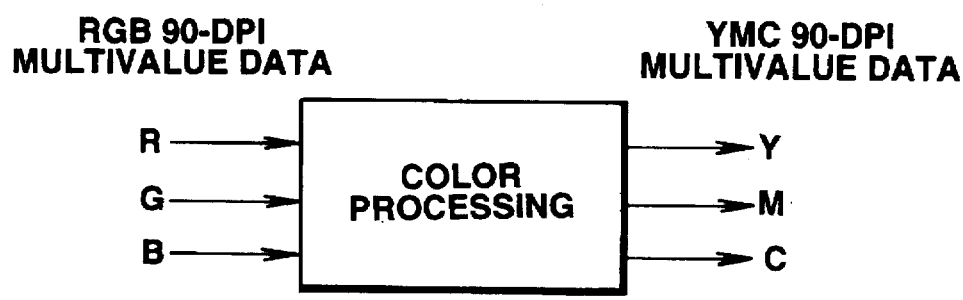
FIG. 10 is a diagram illustrating an equivalent circuit for converting an RGB system into a YMC system in the second embodiment of the present invention.

FIG. 9 is a detailed flow diagram of the above-described bit-map development processing in development memory for preview 41 (step S308). Command analysis unit 23 analyzes the input command (step S401). Image developing unit for preview 42 generates a 90-dpi RGB multivalue bit map in a standard RGB color space (step S402). Color processing unit 28 converts the RGB multivalue bit map in the standard RGB color space into a 90-dpi YMC binary bit map which depends on color printer 20a. The conversion is based on color-processing information for converting standard RGB data stored in color-processing-information memory 27 into YMC data which depends on color printer 20a (step S403). The obtained bit map is developed in development memory for preview 41 (step S404). FIG. 10 illustrates an equivalent circuit for carrying out the color conversion processing of step S403.

In the above-described second embodiment, it is possible to reduce the calculation time of computer 10 required for previewing an image, thereby leaving the CPU of computer 10 more time for other tasks. In addition, since color printer 20a performs color conversion using characteristics of monitor 14, processing by computer 10 can be performed independent of monitor 14 and color printer 20a. Furthermore, since the controller of color printer 20a performs color conversion in accordance with characteristics of monitor 14, computer 10 is only required to display received preview data. In general, the resolution of the monitor is lower than that of the printer. Hence, by providing data having the resolution of the monitor when performing preview, it is possible to reduce the amount of calculations performed in proportion to the square of the resolution, and therefore to increase the speed of development. In addition, since development memory for preview 41 is used, data can be processed at a high speed.

Third Embodiment

Image data transmitted to a color printer represents either a pictorial image, comprising a natual picture or the like, or a CG image, comprising characters, figures or the like. Since the two kinds of images represented by two kinds of image data have different properties, it is desirable to perform different color processing for each of the two kinds of image data. For example, when outputting a pictorial image (data for each pixel), "more preferable color reproduction" may be performed, and when outputting a CG image (command data), "color reproduction for minimizing color difference" may be performed.

More specifically, color processing for a pictorial image includes preferred matching color reproduction processing in which an important or dominant color, such as skin color, is accurately reproduced. On the other hand, color processing for a CG image includes color reproduction processing which gives priority to color matching, in which an entire color space is uniformly sampled a plurality of times and color differences between samples are minimized.

Such color processing is required when the color reproduction range of an input image is greater than the color reproduction range of a printer because colors present in the input image cannot be completely reproduced by the printer. By performing color processing of mapped input image data within the color reproduction range of the printer, an image which closely corresponds chromatically to the input image can be output. As in the present embodiment, by changing color processing in accordance with image type, an output image which closely corresponds chromatically to an input image can be obtained.

The present embodiment, in which the above-described problems are considered, is described in detail below with reference to the drawings.

Figure 11:
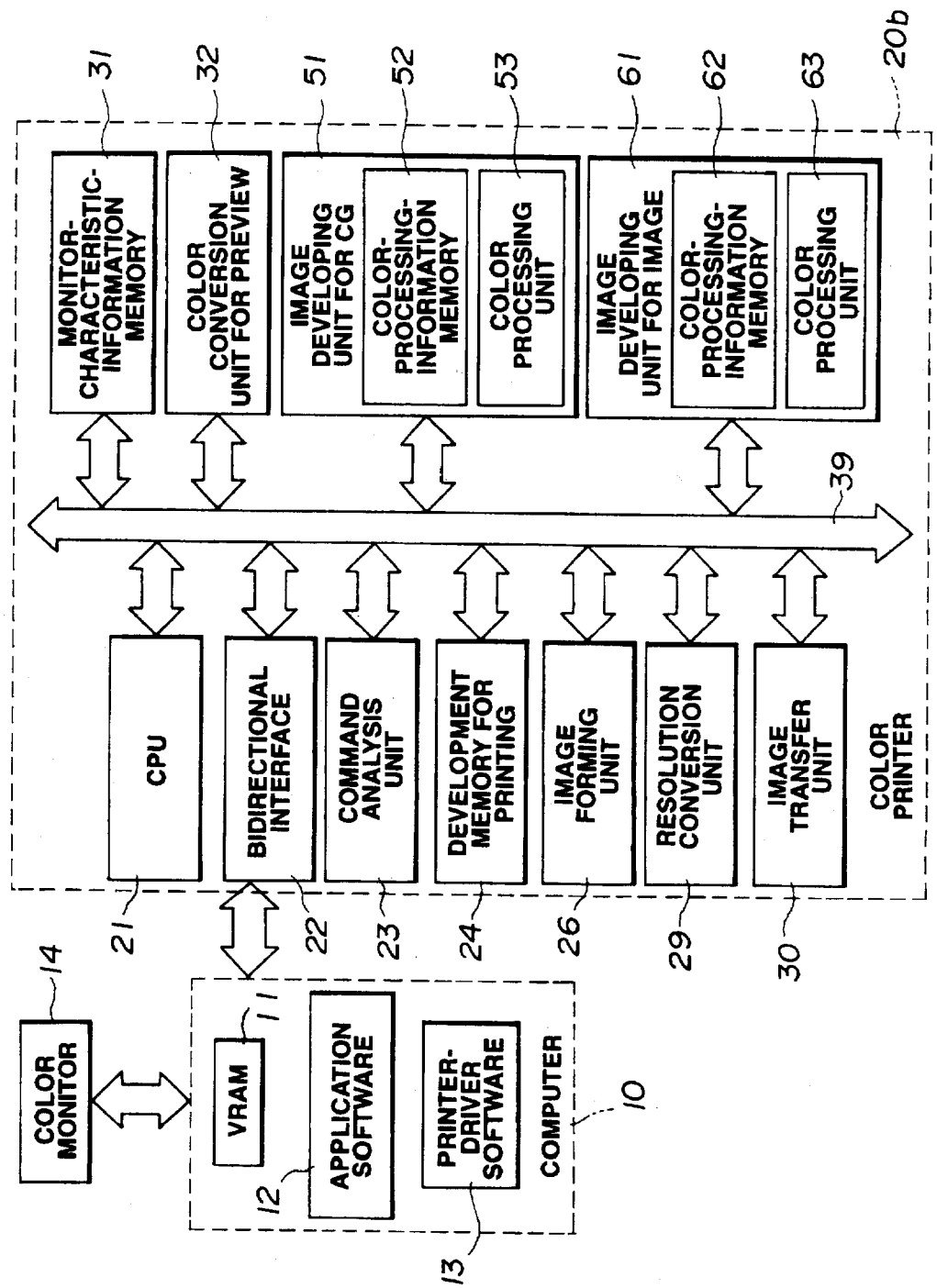
FIG. 11 is a block diagram illustrating the configuration of a third embodiment of the present invention.

FIG. 11 illustrates the configuration of the present embodiment, in which color printer 20b is electrically connected to computer 10. Color printer 20b includes image developing unit for CG 51, which develops the analysis result of command analysis unit 23 in development memory for printing 24. Color-processing-information memory S2 stores color-processing information for CG images; color processing unit 53 performs color processing based on information stored in color-processing-information memory 52; and image developing unit for image 61 develops the analysis result of command analysis unit 23 in development memory for printing 24. Color-processing-information memory 62 stores color-processing information for an image and color processing unit 63 performs color processing based on information stored in color-processing-information memory 62. Image forming unit 26 forms an image based on multivalue data.

Bidirectional interface 22 is a bidirectional Centronix interface. Image data supplied from computer 10 to monitor 14 and to color printer 20b is 8-bit, 90-dpi RGB data and image data supplied to image forming unit 26 is 8-bit, 360-dpi YMC data.

Figure 12:
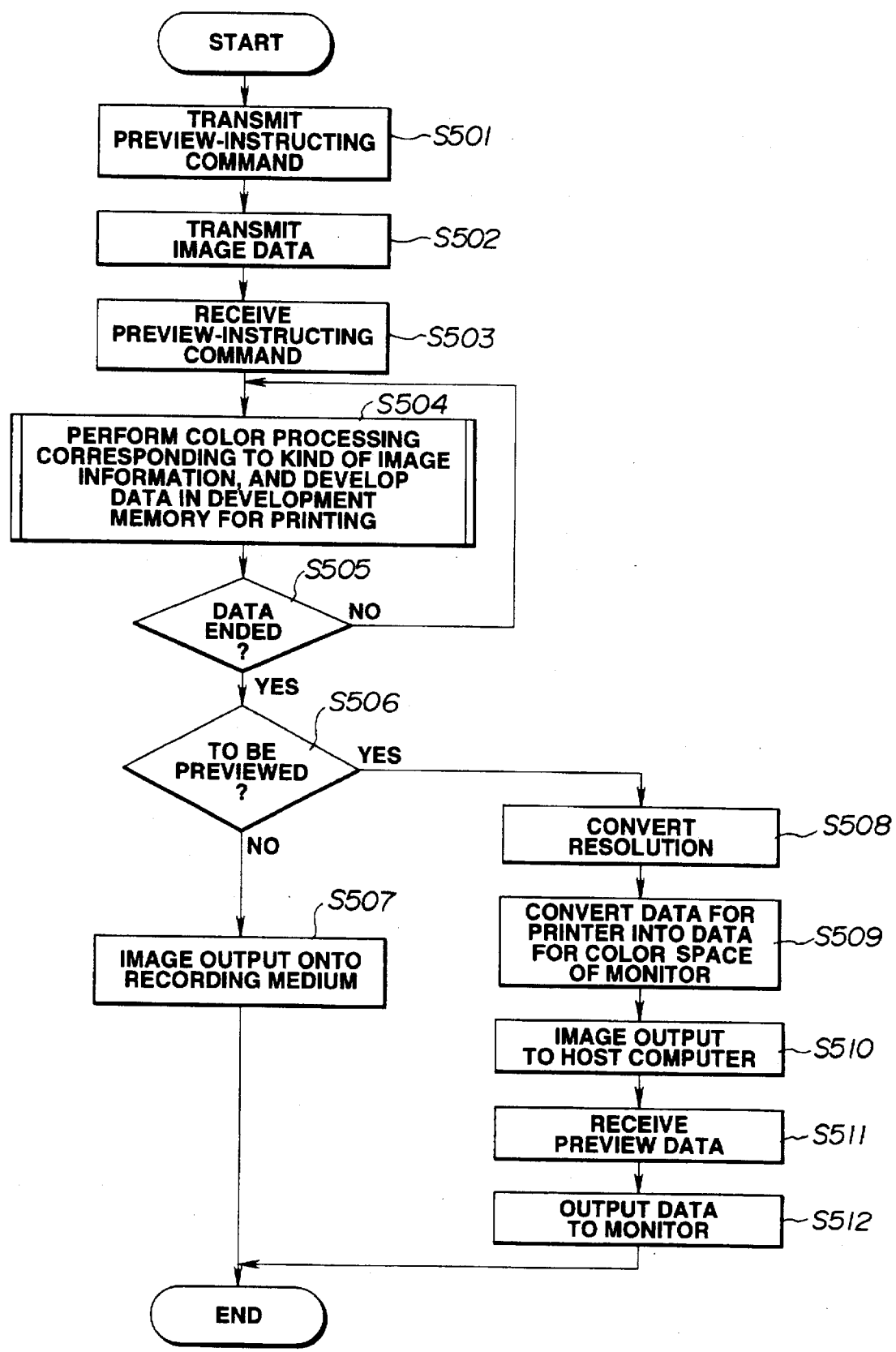
FIG. 12 is a flowchart showing an example of printing-information processing procedures performed by the color printer shown in FIG. 11 and a computer.

FIG. 12 is a flow diagram illustrating an example of printing-information processing procedures peformed by color printer 20b and computer 10 in the present embodiment.

In FIG. 12, steps S501, S502, S511 and S512 correspond to the processing of computer 10 and steps S503–S510 correspond to the processing of color printer 20b.

In order to obtain a printed image corresponding to a generated image, computer 10 transmits a preview-instructing command to color printer 20b via application software 12 and printer-driver software 13 (step S501). Image data is then transmitted to color printer 20b (step S502).

Color printer 20b reads the preview-instructing command from bidirectional interface 22 and command analysis unit 23 analyzes the preview-instructing command. Color printer 20b determines whether the image data is to be previewed and stores a look-up table comprising combinations of RGB multivalue data which depend on monitor 14, and YMC multivalue data which depend on color printer 20b, in monitor-characteristic-information memory 31 (step S503). Thereafter, the data received from computer 10 via bidirectional interface 22 is subjected to bit-map development in development memory for printing 24 (step S504). The bit-map development is repeated until all image data has been developed (step S505).

When all image data has been developed, it is determined whether preview is to be performed based on the preview-instructing command (step S506). If it is determined that preview is not to be performed, data stored in development memory for printing 24 is printed on a recording medium, such as paper, by image forming unit 26 (step S507).

If it is determined in step S506 that preview is to be performed, the 360-dpi YMC image data is converted into 90-dpi YMC image data (step S508). Color conversion unit for preview 32 receives information from monitor-characteristic-information memory 31 and converts the 90-dpi YMC image data into 90-dpi RGB image data for preview (step S509). Image transfer unit 30 transfers the image data for preview to computer 10 (step S510). Computer 10 receives 8-bit 90-dpi RGB output image data (step S511) and outputs the received image data to monitor 14 (step S512).

Figure 13:
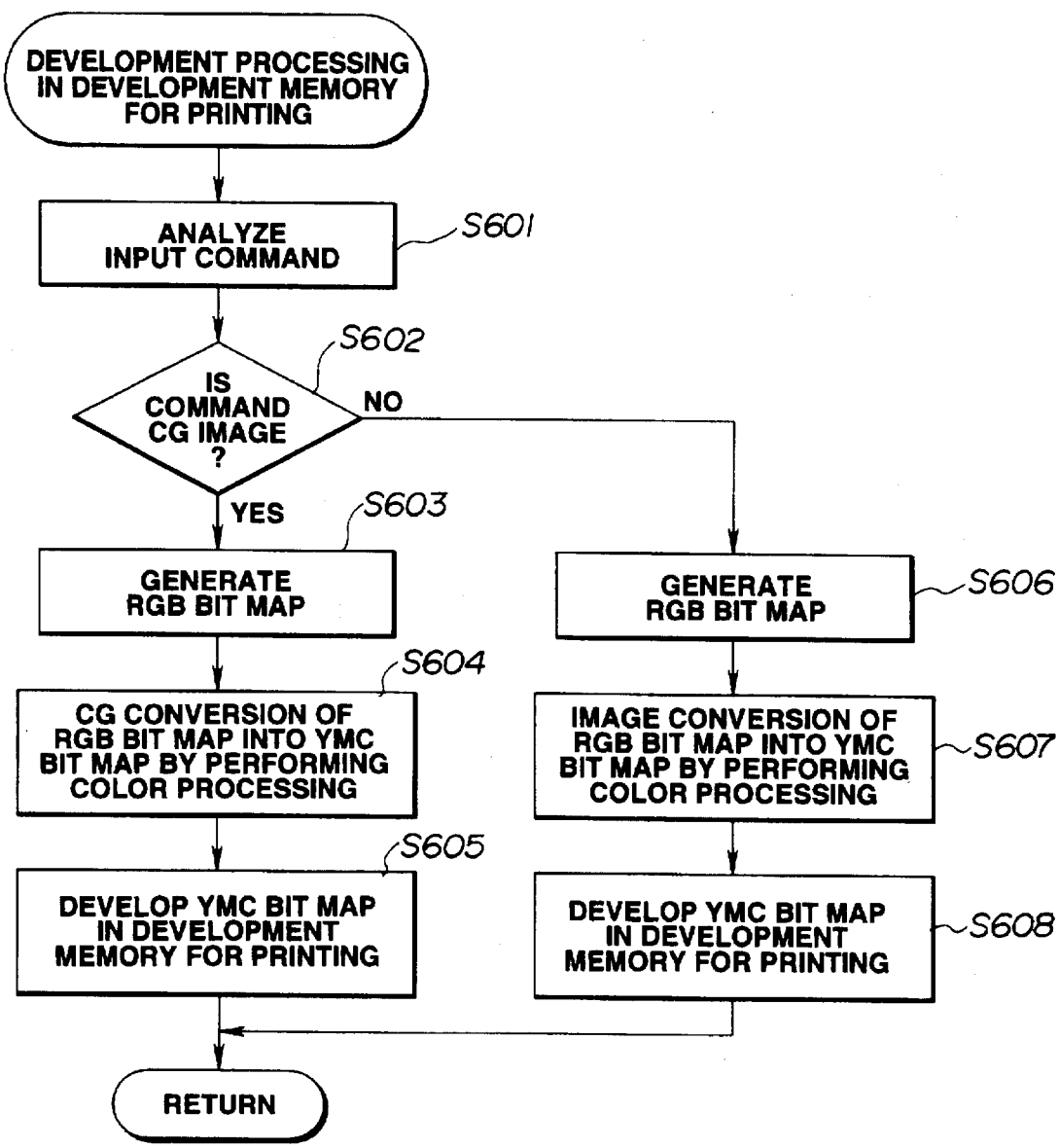
FIG. 13 is a flowchart of bit-map development in the third embodiment of the present invention.

FIG. 13 is a detailed flow diagram of bit-map development processing in development memory for printing 24 (step S504). Command analysis unit 23 analyzes the input command (step S601) and determines whether the input command is for a CG image (step S602). If it is determined that the input command is for a CG image, an RGB multivalue bit map in a standard RGB space is generated (step S603). Color processing unit 53 of image developing unit for CG 51 receives color-processing information for a CG image from color-processing-information memory 52 and converts the 360-dpi RGB multivalue bit map, which depends on monitor 14, into a 360-dpi YMC multivalue bit map, which depends on color printer 20b (step S604). Image developing unit for CG 51 then develops the obtained bit map in development memory for printing 24 (step S605).

On the other hand, if the input command is for a pictorial image, a 360-dpi RGB multivalue bit map is generated in the standard RGB space (step S606). Color processing unit 63 of image developing unit for image 61 receives color-processing information for a pictorial image from color-processing-information memory 62 and converts the 360-dpi RGB multivalue bit map, which depends on monitor 14, into a 360-dpi YMC multivalue bit map, which depends on color printer 20b (step S607). Color processing unit 63 then develops the obtained bit map in development memory for printing 24 (step S608).

In the above-described third embodiment, it is possible to reduce the calculation time of computer 10 required for previewing an image, thereby leaving the CPU of computer more time for other tasks. In addition, since color printer 20b performs color conversion using characteristics of the monitor 14, processing by computer 10 can be performed independent of monitor 14 and color printer 20b. Furthermore, since the controller Of color printer 20 performs color conversion in accordance with characteristics of monitor 14, computer 10 is only required to display received preview data.

Accordingly, even for an output device which performs color reproduction processing, such as the above-described printer, an image which closely corresponds chromatically to that produced by an output device can be displayed on a monitor.

The input color image information is not limited to that described above. Other types of color-image information may be used. For example, code data used when forming an image by assigning a color by a color number of a color patch may be used.

Fourth Embodiment

Figure 14:
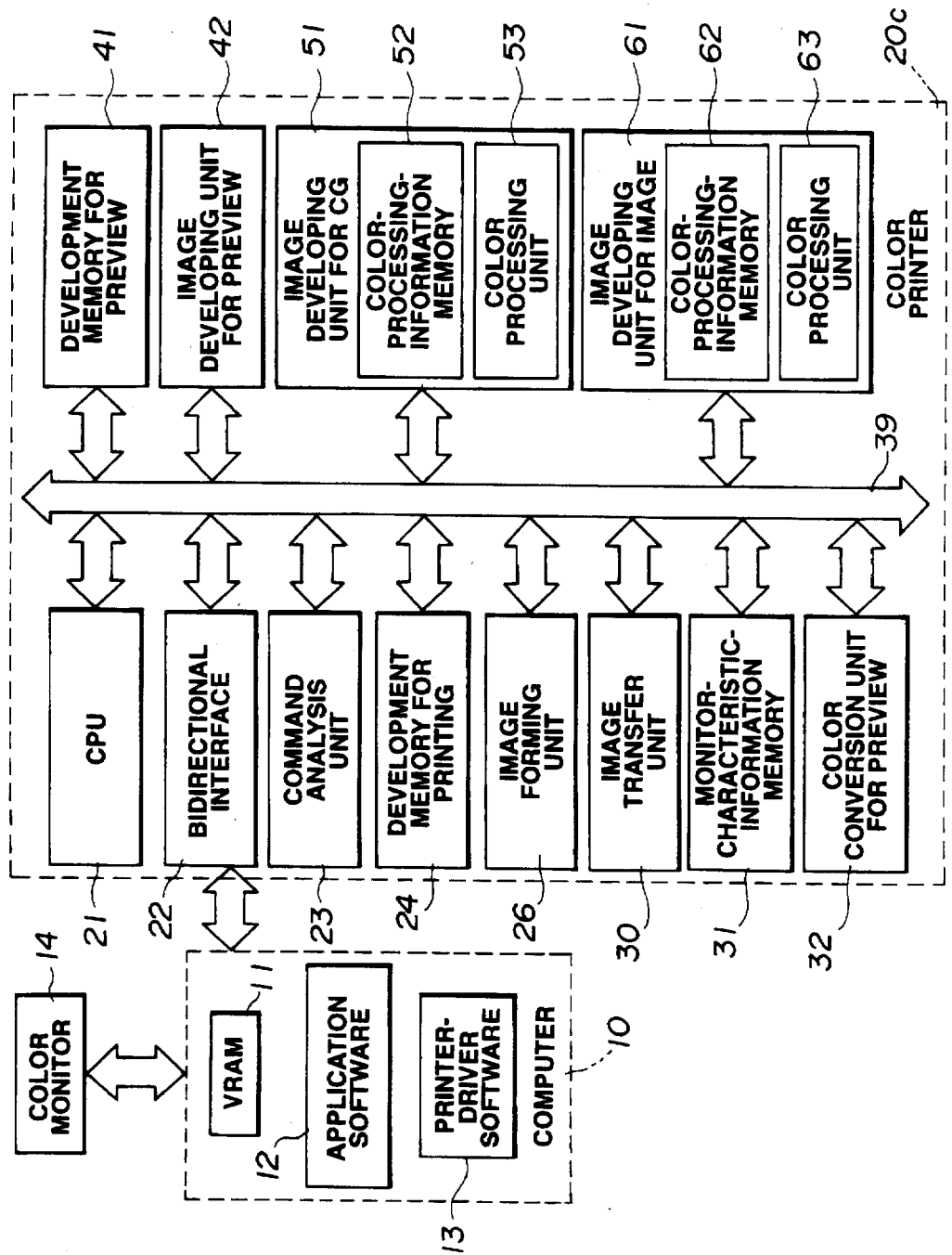
FIG. 14 is a block diagram illustrating the configuration of a fourth embodiment of the present invention.

FIG. 14 illustrates the configuration of a fourth embodiment of the present invention, which is a modification of the third embodiment.

Color printer 20c of the fourth embodiment includes development memory for preview 41, and an image developing unit for preview 42.

In the present embodiment, bidirectional interface 22 is a bidirectional Centronix interface. Image data supplied from computer 10 to monitor 14 and to color printer 20c is 8-bit, 90-dpi RGB data; image data supplied to image forming unit 26 is 8-bit, 360-dpi YMC data; and image data developed in development memory for preview 41 is 8-bit, 90-dpi YMC data.

Figure 15:
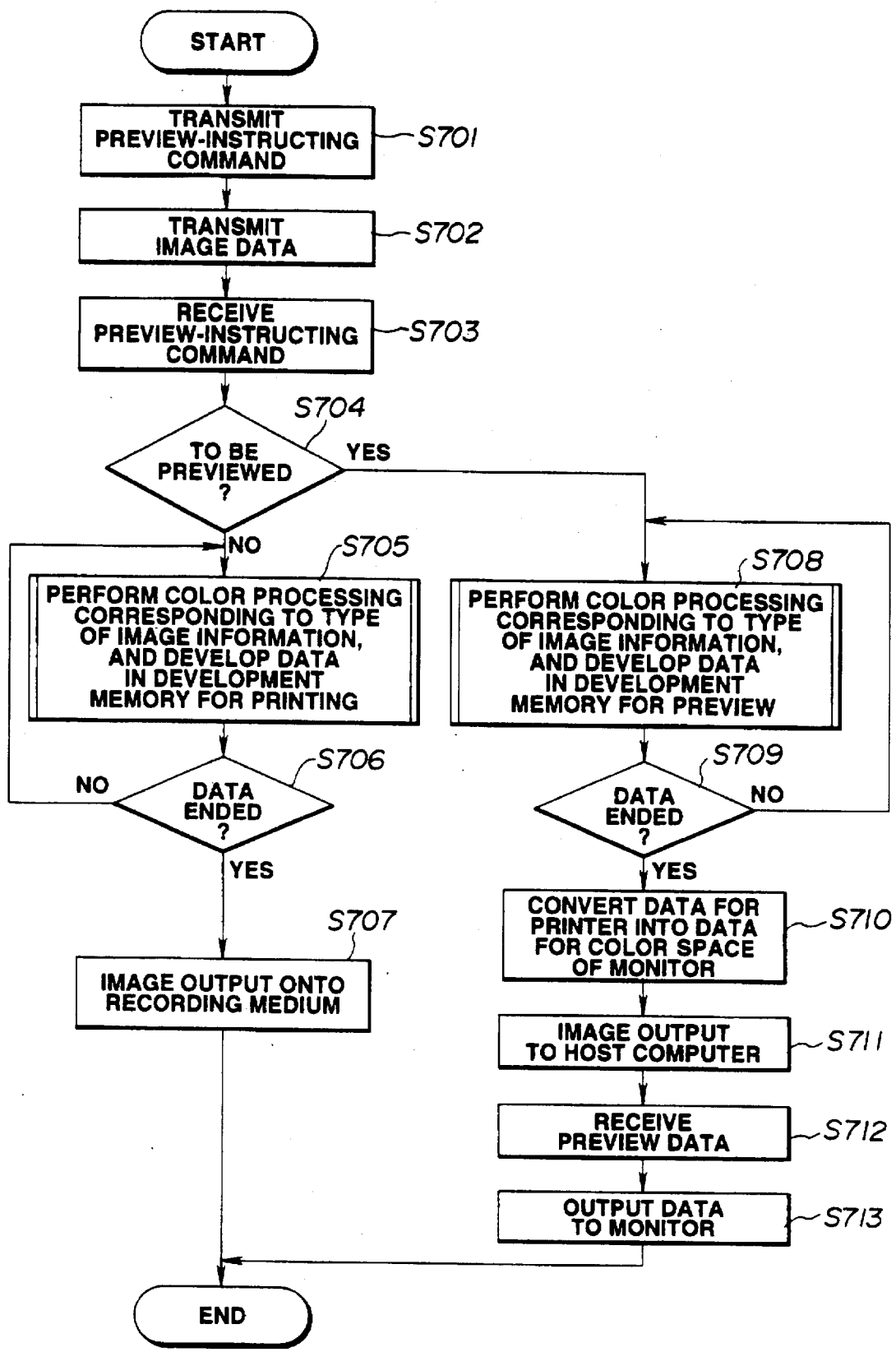
FIG. 15 is a flowchart showing an example of printing-information processing procedures performed by the color printer shown in FIG. 14 and a computer.

FIG. 15 is a flow diagram illustrating an example of printing-information processing procedures peformed by color printer 20c and computer 10. In order to obtain a printed image which corresponds to an image generated on a monitor, computer 10 transmits a preview-instructing command to color printer 20c via application software 12 and printer-driver software 13 (step S701). Image data is then transmitted to color printer 20c (step S702).

Color printer 20c receives the preview-instructing command through bidirectional interface 22 and stores information in monitor-characteristic-information memory 31 (step S703). Based on the preview-instructing command, color printer 20c then determines whether the image data is to be previewed (step S704). If the received image data is not to be previewed, the image data (received from computer 10 via bidirectional interface 22) is subjected to bit-map development in development memory for printing 24 (step S705). Bit-map development is performed until all of the image data has been developed (step S706). Image forming unit 26 prints the image data stored in development memory for printing 24 on a recording medium, such as paper (step S707).

If the result of the determination in step S704 is affirmative, i.e., the received image data is to be previewed, the received image data the data is subjected to bit-map development in development memory for preview 41 (step S708). The bit-map development is performed until all of the image data has been developed (step S709).

When all of the image data has been developed, color conversion unit for preview 32 receives information from the monitor-characteristic-information memory 31 and converts the 90-dpi YMC image data, which depends on color printer 20c, into 90-dpi RGB image data, which depends on monitor 14 (step S710). Image transfer unit 30 transfers the obtained RGB data to computer 10 (step S711) which receives the 8-bit, 90-dpi RGB output image data (step S712) and displays the received image data on monitor 14 (step S713).

Figure 16:
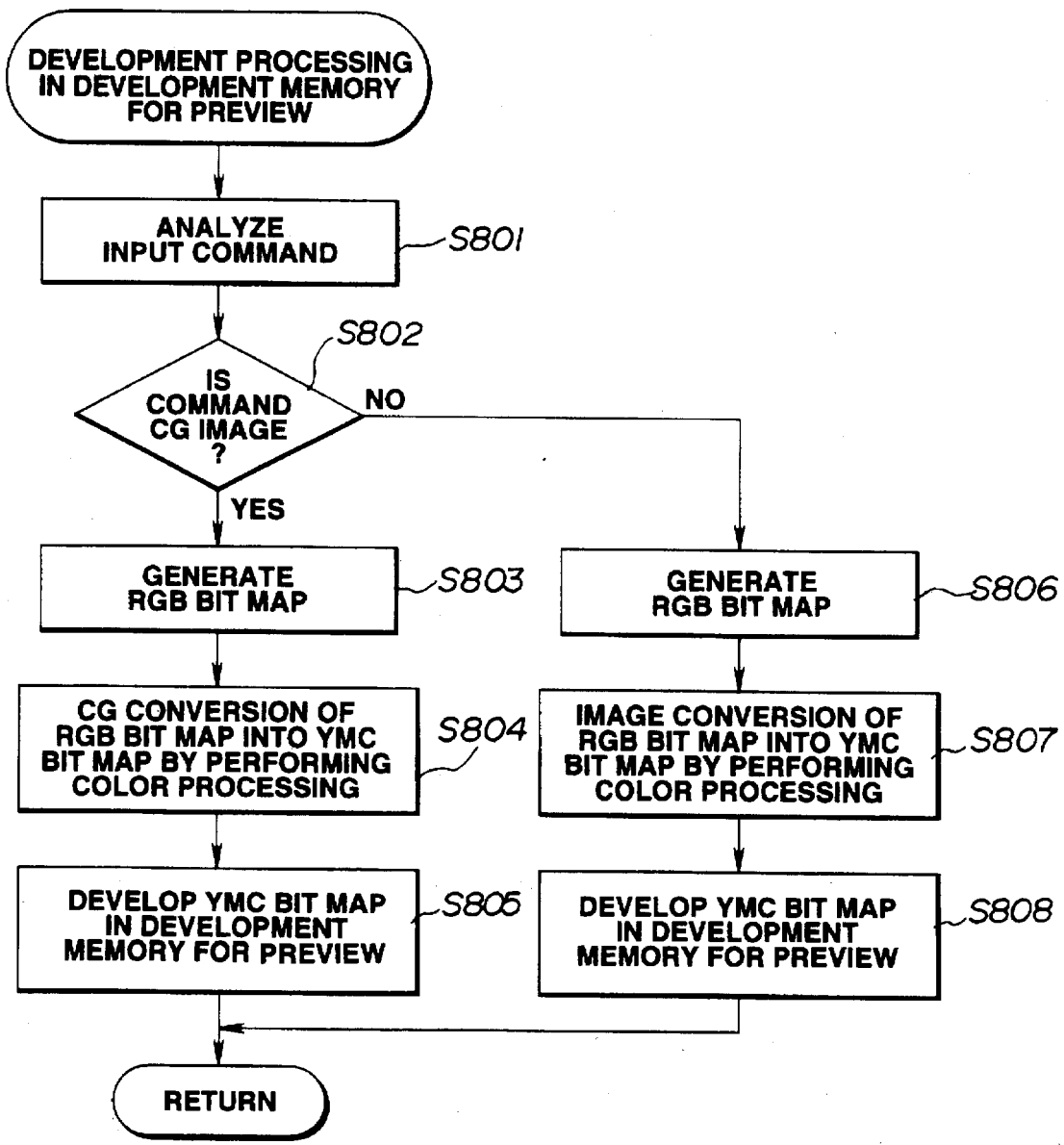
FIG. 16 is a flowchart of bit-map development in the fourth embodiment of the present invention.

FIG. 16 is a detailed flow diagram of the above-described bit-map development processing in development memory for preview 41 (step S708). Command analysis unit 23 analyzes the input preview-instructing command (step S801) and determines whether the command is for fa CG image (step S802). If the preview-instructing command is for a CG image, image developing unit for CG 51 generates a 90-dpi RGB multivalue bit map (step S803). Color processing unit 53 receives color-processing information from color-processing-information memory 52 and converts the 90-dpi RGB multivalue bit map, which depends on monitor 14, into a 90-dpi YMC multivalue bit map, which depends on the color printer 20c (step S804). The obtained bit map is then developed in development memory for preview 24 (step S805). FIG. 10 illustrates an equivalent circuit for performing the color conversion processing of step S804. If the preview-instructing command is for a pictorial image, image developing unit for image 61 generates a 90-dpi RGB multivalue bit map (step S806). Color processing unit 63 receives color-processing information from color-processing-information memory 62 and converts the 90-dpi RGB multivalue bit map in the color space of monitor 14 into a 90-dpi YMC binary bit map in the color space of the color printer 20c (step S807). The obtained bit map is then developed in development memory for preview 24 (step S808).

In the above-described fourth embodiment, it is possible to reduce the calculation time of computer 10 required for previewing an image, thereby leaving the CPU of computer 10 more time for other tasks. In addition, since color printer 20c performs color conversion using characteristics of monitor 14, processing by computer 10 can be performed independent of monitor 14 and color printer 20b. Furthermore, since color printer 20c performs color conversion in accordance with characteristics of monitor 14, computer 10 is only required to display received preview data. In general, the resolution of the monitor is lower than that of the printer. Hence, by providing image data having a resolution equal to that of the monitor for performing preview, it is possible to reduce the amount of calculation in proportion to the square of the resolution, and therefore to increase the speed of development.

The present invention is not limited to the case of generating preview-image information based on an instruction from a computer, but may also be applied to a case in which an instruction is provided from a color printer.

Various methods for resolution conversion processing image data for an image into image data for preview may be used in the above-described embodiments. These include, but are not limited to, a method of skipping pixels and a method of forming image data after skipping pixels based on pixels surrounding a target pixel.

Although in the above-described embodiments, monitor-characteristic information is transmitted every time processing is performed, the present invention is not limited to such an approach. For example, monitor-characteristic information may be stored in a monitor-information memory of a color printer after processing has been completed, and monitor-characteristic information may be transmitted whenever characteristics of the monitor change.

A variety of color printers may be used in the present invention. These include, but are not limited to, an electrophotographic color printer, an ink-jet color printer, and an apparatus which uses a head to discharge liquid droplets by film boiling. Although in the above-described embodiments, YMC data is used as data for image formation, any other data, such as YMCK data or the like, may also be used.

As described above, according to the present invention, it is possible to decentralize processing, reduce the load on the computer, and easily generate a preview-processing program. When forming an image on a recording material based on image information, a color preview image which is faithful to the formed image can be displayed on the monitor. Furthermore, it is possible to easily generate color-preview-image information corresponding to each monitor.

Individual components designated by blocks in the drawings are all well known in the image processing art. Therefore, their specific construction and operation are not critical to the operation or the best mode for carrying out the present invention. As such, they will not be described in detail herein.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications, equivalent structures and functions.

What is claimed is:

1. An image forming apparatus comprising:
    input means for inputting color-image information from a host computer via a bidirectional communication line;
    image forming means for forming an image onto a recording material based on the color-image information;
    generation means for generating color-preview-image information for reproducing the image formed by the image forming means on a color monitor; and
    transmitting means for transmitting the color-preview-image information from the image forming apparatus to the host computer via the bidirectional communication line.

2. An image forming apparatus according to claim 1, wherein said generation means generates the color-preview-image information by performing color processing for each of a plurality of types of input color-image information which represent a color image.

3. An image forming apparatus according to claim 2, wherein the plurality of types of color-image information comprise natural image information and CG image information.

4. An image forming apparatus according to claim 3, wherein said generation means performs preferred color matching for the natural image information, and
    wherein said generation means performs color matching for the CG image information so as to minimize a color difference between the input color-image information and the image formed on the recording material.

5. An image forming apparatus according to claim 1, further comprising determination means for determining whether preview is to be performed.

6. An image forming apparatus according to claim 1, wherein the host computer transmits color-conversion information necessary for generating the color-preview-image information to the generation means.

7. An image forming apparatus according to claim 1, further comprising storage means for storing color-conversion information necessary for generating a preview image from the color-preview-image information.

8. An image forming apparatus according to claim 1, wherein said generation means obtains image data corresponding to a number of gradation steps of the image forming means, and generates the color-preview-image information in accordance with the obtained image data.

9. An image processing method for previewing a color image on a color monitor prior to forming the color image onto a recording material, said method comprising the steps of:
    outputting color image data for the color image to an image forming means operable to use the color image data to form the color image onto the recording material;
    generating color-preview-image information for reproducing the color image formed by the image forming means on a color monitor;
    reducing a resolution of the color-preview-image information generated in said generating step; and
    transmitting the color-preview-image information having a resolution reduced in said reducing step to a host computer which transmits the color-preview-image information to the color monitor in order to preview the color image.

10. An image processing method according to claim 9, wherein the generating step includes generating the color-preview-image information by performing color processing for each of a plurality of types of input color-image information which represent a color image.

11. An image processing method according to claim 10, wherein the plurality of types of input color-image information comprise natural image information and CG image information.

12. An image processing method according to claim 11, wherein said generating step performs preferred color matching for the natural image information, and wherein said generating step performs color matching for the CG image information so as to minimize a color difference between the input color-image information and the image formed on the recording material.

13. An image processing method according to claim 9, further comprising the step of determining whether preview is to be performed.

14. An image processing method according to claim 9, wherein the host computer transmits color-conversion information necessary for generating the color-preview-image information to a generation means.

15. An image processing method according to claim 9, further comprising storing in a storage means color-conversion information necessary for generating a preview image from the color-preview-image information.

16. An image processing method according to claim 9, wherein said generating step includes obtaining image data corresponding to a number of gradation steps of an image forming means, and generating the color-preview-image information in accordance with the obtained image data.

* * * * *

UNITED STATES PATENT AND TRADEMARK OFFICE
CERTIFICATE OF CORRECTION

PATENT NO. : 5,675,717
DATED : October 7, 1997
INVENTOR(S) : Tsuyoshi Yamamoto

It is certified that error appears in the above-identified patent and that said Letters Patent is hereby corrected as shown below:

<u>COLUMN 3</u>

Line 46, "28" should read --25--.

<u>COLUMN 8</u>

Line 11, "S2" should read --52--.

Signed and Sealed this

Fourteenth Day of April, 1998

Attest:

BRUCE LEHMAN

Attesting Officer

Commissioner of Patents and Trademarks